No. 798,826. PATENTED SEPT. 5, 1905.
A. F. PIEPER.
REGULATOR.
APPLICATION FILED AUG. 29, 1903. RENEWED MAR. 3, 1905.
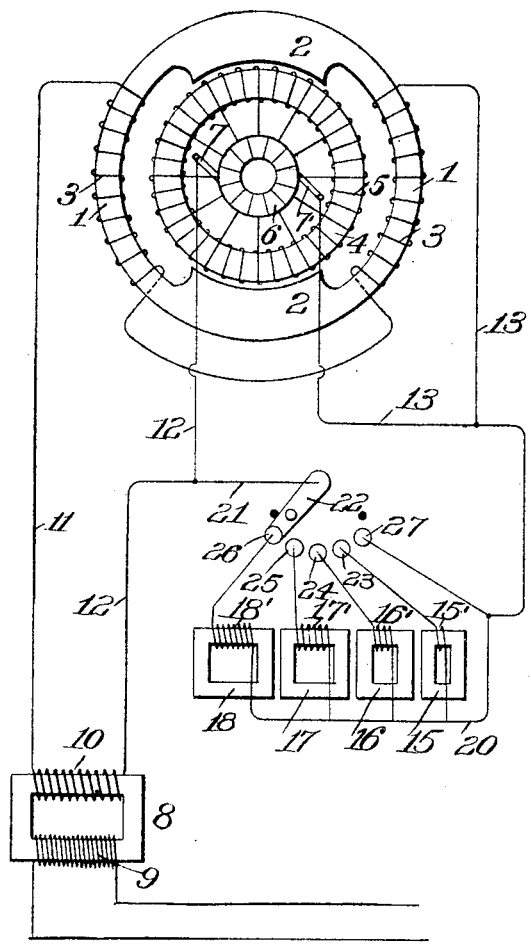

UNITED STATES PATENT OFFICE.

ALPHONSE F. PIEPER, OF ROCHESTER, NEW YORK.

REGULATOR.

No. 798,826.     Specification of Letters Patent.     Patented Sept. 5, 1905.

Application filed August 29, 1903. Renewed March 3, 1905. Serial No. 248,332.

*To all whom it may concern:*

Be it known that I, ALPHONSE F. PIEPER, of Rochester, in the county of Monroe and State of New York, have invented certain new and useful Improvements in Regulators; and I do hereby declare the following to be a full, clear, and exact description of the same, reference being had to the accompanying drawing, forming a part of this specification, and to the reference-numerals marked therein.

My present invention relates to that class of devices known as "regulators" or "controllers" for electrically-operated apparatus, and particularly to such as are operated by alternating currents; and it has for its object to provide a device employing an inductive winding having varying turns which is so constructed that as the circuit is transferred from one part of the winding to another the induced current and the consequent disturbances created thereby will be eliminated.

To this and other ends my invention consists in certain features of novelty and advantage to be hereinafter more fully described, and pointed out in the claims hereto annexed.

The accompanying drawing is a diagrammatic illustration of a regulator constructed in accordance with my invention, showing it employed in connection with an electric motor.

While my invention comprehends a device adapted for regulating electric currents in any form of electrical apparatus to control its operation, I have illustrated its construction and operation in connection with an electric motor adapted particularly to be operated by an alternating current.

The motor to which I have shown the regulator applied is one of the direct-current type, having the field-magnet 1 provided with the pole-pieces 2 and the windings 3. The armature is indicated by 4 and embodies the armature-coils 5, which are connected at intervals with the sections of the commutator 6. The commutator-brushes 7 and 7' coöperate with the commutator and connect the field-coils, which are in the neutral point of the magnet, as will be understood. The source of current for supplying the motor is a transformer, indicated by 8 and containing the primary coil 9 in the main circuit or source of current supply, and the secondary coil 10, which is connected to one of the field-coils by a conductor 11 and to the brush 7 by a conductor 12. As this motor is connected in series a conductor 13 leads from the other brush 7' to the field-coil 3, as shown.

The regulating device embodies a plurality of cores—in the present instance four being shown and indicated by 15, 16, 17, and 18—which, if it is desired, may be a ring or otherwise formed to provide a closed-magnet circuit. Each core is provided with a separate winding 15', 16', 17', and 18', and these windings vary in the number of turns to give each of them a different inductive force. When the regulator is employed in connection with the motor before described, it is arranged so that one or another of the inductive windings is arranged in a circuit forming a shunt with the commutator-brushes 7 7', which is accomplished by connecting all of said windings to a conductor 20, forming one side of said circuit and connected to the wire 13, leading to the brush 7'. The other side of the shunt-circuit consists of a conductor 21, leading from the brush 7, embodying a movable switch-arm or contact member 22, adapted to successively engage with separate contact-points 23, 24, 25, and 26, forming the terminals, respectively, of the several inductive windings 15', 16', 17', and 18'.

To vary the operation of the motor or other electrically-operated apparatus, the contact member 22, engaging the point 26, places the inductive winding having the greater number of turns in the shunt. By moving the member 22 toward the point 23 the operation of the apparatus may be controlled as desired, as said member engages the other contact-points successively, bringing the other windings, of less turns or having less inductive electromotive power, into the shunt, thus reducing the speed of the motor. When the switch reaches the contact-point 27, the inductive windings are all cut out, and the motor-armature being short-circuited is brought immediately to a position of rest.

This construction of the regulator is an advantageous one, as it enables the terminal contact-points of the several inductive windings to be arranged in proximity, so that the contact member 22 may engage one before it is moved out of contact with another, thereby preventing any break or interruption in the current flowing to the motor or other apparatus, and the several windings being provided with separate cores the difficulty experienced from the excessive sparking between the contact-points and the movable member which occurs when said windings are arranged on the same core is eliminated.

I claim as my invention—

1. A regulator for electric currents consisting of a plurality of inductive windings differing in induction wound on different cores and means for closing a circuit through said windings.

2. A regulator for electric currents consisting of a plurality of inductive windings differing in the number of turns wound on different cores and means for closing a circuit through said windings.

3. A regulator for electric currents consisting of a plurality of separate cores, windings of different induction on the separate cores and means for closing a circuit through said windings.

4. The combination with an electric circuit, of a regulator embodying a plurality of inductive windings differing in induction and connected at one side of the circuit and means coöperating with the separate windings, connected to the other side of the circuit.

5. The combination with an electrical apparatus for alternating current, of a regulator arranged in the circuit and embodying a plurality of inductive windings differing in induction wound on different cores and means for closing the circuit through said windings.

6. In combination in a motor for alternating currents field-windings, armature-coils, commutator and commutator-brushes, connected in series, a plurality of inductive windings differing in induction, a conductor connecting one of the brushes with said windings and a separate conductor leading from the other brush and adapted to coöperate with said windings to close the circuit and form a shunt around said brushes.

7. In a regulator for electric apparatus, the combination with a circuit and a plurality of inductive windings wound on different cores, said windings being connected independently to one side of the circuit, of contacts for separate windings located in proximity to each other and a contact-finger arranged in the other side of the circuit and adapted to engage two contacts when moving from one contact to another.

ALPHONSE F. PIEPER.

Witnesses:
G. WILLARD RICH,
HENRY W. HALL.